United States Patent
Yendluri et al.

(10) Patent No.: US 11,294,060 B2
(45) Date of Patent: Apr. 5, 2022

(54) SYSTEM AND METHOD FOR LIDAR-BASED VEHICULAR LOCALIZATION RELATING TO AUTONOMOUS NAVIGATION

(71) Applicant: Faraday & Future Inc., Gardena, CA (US)

(72) Inventors: Daedeepya Yendluri, Torrance, CA (US); Sowmya Gade, Torrance, CA (US); Anupama Kuruvilla, Irvine, CA (US); Aziz Umit Batur, Torrance, CA (US)

(73) Assignee: Faraday & Future Inc., Gardena, CA (US)

( * ) Notice: Subject to any disclaimer, the term of this patent is extended or adjusted under 35 U.S.C. 154(b) by 89 days.

(21) Appl. No.: 15/956,623

(22) Filed: Apr. 18, 2018

(65) Prior Publication Data

US 2019/0323844 A1 Oct. 24, 2019

(51) Int. Cl.
*G01S 17/89* (2020.01)
*G01C 21/32* (2006.01)
*G06T 17/05* (2011.01)
*G06F 16/29* (2019.01)

(52) U.S. Cl.
CPC ............. *G01S 17/89* (2013.01); *G01C 21/32* (2013.01); *G06F 16/29* (2019.01); *G06T 17/05* (2013.01); *G06T 2207/10028* (2013.01)

(58) Field of Classification Search
CPC .................................................... G01C 21/32
See application file for complete search history.

(56) References Cited

U.S. PATENT DOCUMENTS

| 8,756,085 B1* | 6/2014 | Plummer | H04N 13/204 |
| | | | 705/4 |
| 9,043,069 B1* | 5/2015 | Ferguson | B60W 30/00 |
| | | | 701/23 |
| 9,311,706 B2 | 4/2016 | Natroshvili et al. | |
| 9,557,741 B1 | 1/2017 | Elie et al. | |
| 9,575,321 B2 | 2/2017 | Osterhout et al. | |
| 9,676,389 B2 | 6/2017 | Clarke et al. | |

(Continued)

OTHER PUBLICATIONS

Non-Final Office Action dated Apr. 26, 2018, for U.S. Appl. No. 15/365,410, filed Nov. 30, 2016, eleven pages.

(Continued)

*Primary Examiner* — Alex C Dunn
(74) *Attorney, Agent, or Firm* — Veros Legal Solutions, LLP (57) ABSTRACT

A system for use in a vehicle, the system comprising one or more sensors, one or more processors operatively coupled to the one or more sensors, and a memory including instructions, which when executed by the one or more processors, cause the one or more processors to perform a method. The method comprising capturing a current point cloud with the one or more sensors, determining an estimated location and an estimated heading of the vehicle, selecting one or more point clouds based on the estimated location and heading of the vehicle, simplifying the current point cloud and the one or more point clouds, correlating the current point cloud to the one or more point clouds, and determining an updated estimate of the location of the vehicle based on correlation between the current point cloud and the one or more point clouds.

20 Claims, 6 Drawing Sheets

(56) References Cited

U.S. PATENT DOCUMENTS

| | | |
|---|---|---|
| 9,896,091 B1 | 2/2018 | Kurt et al. |
| 10,024,664 B1 * | 7/2018 | Gill .................. G01C 21/00 |
| 10,025,317 B2 | 7/2018 | Batur et al. |
| 10,176,596 B1 * | 1/2019 | Mou .................. G06T 7/80 |
| 10,528,823 B2 * | 1/2020 | Guo .................. G06T 7/10 |
| 2004/0001620 A1 * | 1/2004 | Moore ............... G06K 9/6211 382/154 |
| 2004/0054473 A1 | 3/2004 | Shimomura |
| 2004/0267420 A1 | 12/2004 | Tanaka et al. |
| 2007/0282504 A1 | 12/2007 | Luke et al. |
| 2009/0259365 A1 | 10/2009 | Rohlfs et al. |
| 2010/0070138 A1 | 3/2010 | Schoening et al. |
| 2010/0231416 A1 | 9/2010 | Wu et al. |
| 2013/0010119 A1 | 1/2013 | Mitsugi |
| 2013/0021171 A1 | 1/2013 | Hsu et al. |
| 2014/0037194 A1 * | 2/2014 | Kitamura ............ G01B 11/24 382/154 |
| 2014/0168073 A1 * | 6/2014 | Chizeck .............. G06F 3/016 345/156 |
| 2014/0192181 A1 | 7/2014 | Taylor et al. |
| 2015/0057887 A1 | 2/2015 | Kim |
| 2015/0104096 A1 * | 4/2015 | Melax .................. G06T 7/20 382/154 |
| 2015/0151725 A1 | 6/2015 | Clarke et al. |
| 2015/0210274 A1 | 7/2015 | Clarke et al. |
| 2015/0336547 A1 | 11/2015 | Dagan |
| 2015/0355468 A1 | 12/2015 | Osterhout et al. |
| 2016/0049008 A1 | 2/2016 | Haddick et al. |
| 2017/0084037 A1 * | 3/2017 | Barajas Hernandez .................... G06K 9/4671 |
| 2017/0094262 A1 * | 3/2017 | Peterson ............ H04N 21/854 |
| 2017/0126968 A1 * | 5/2017 | Somanath ........... H04N 13/207 |
| 2017/0151883 A1 | 6/2017 | Bae et al. |
| 2017/0297385 A1 | 10/2017 | Kim |
| 2017/0300062 A1 | 10/2017 | Kim |
| 2018/0029591 A1 | 2/2018 | Lavoie |
| 2018/0144202 A1 * | 5/2018 | Moosaei ............ G06K 9/6274 |
| 2018/0158206 A1 * | 6/2018 | Han .................. G01C 21/32 |
| 2018/0216943 A1 * | 8/2018 | Hawkins ............. G06T 7/11 |
| 2019/0011927 A1 * | 1/2019 | Mou ................. G06K 9/00791 |
| 2019/0122375 A1 * | 4/2019 | Wang ................ G06T 19/00 |
| 2019/0205695 A1 * | 7/2019 | Yan .................. G06K 9/00201 |
| 2019/0392225 A1 * | 12/2019 | Chihara ............. G06K 9/0063 |

OTHER PUBLICATIONS

Notice of Allowance dated Mar. 15, 2018, for U.S. Appl. No. 15/620,665, filed Jun. 12, 2017, seven pages.

* cited by examiner

SYSTEM AND METHOD FOR LIDAR-BASED VEHICULAR LOCALIZATION RELATING TO AUTONOMOUS NAVIGATION

FIELD OF THE DISCLOSURE

This relates generally to LIDAR-based vehicle localization for autonomous vehicle navigation.

BACKGROUND OF THE DISCLOSURE

Vehicles, especially automobiles, increasingly include various systems and sensors for determining the vehicle's location. Current localization techniques for vehicles include Global Positioning Systems (GPS). GPS techniques (including Global Navigation Satellite Systems (GNSS)), however, can result in some uncertainty under certain conditions. For example, GPS localization can be inaccurate because of signal blockage (e.g., due to tall buildings, being in a tunnel or parking garage), signal reflections off of buildings, or atmospheric conditions. This results in an average localization accuracy of around five meters with GPS. While higher quality GPS receivers (e.g., differential GPS (dGPS)) can achieve less than ten centimeter accuracy, these high quality GPS receivers are not yet available for use in production vehicles. Accurate localization of a vehicle, however, is critical to achieve safe autonomous vehicle navigation. Therefore, a solution to enhance localization techniques for autonomous vehicle navigation can be desirable.

SUMMARY OF THE DISCLOSURE

Examples of the disclosure are directed to enhancing localization techniques for safe autonomous driving navigation. A system in accordance with a preferred embodiment of the present invention estimates a current location and heading of a vehicle using a location system such as GPS, and captures data about the vehicle's surroundings using on-board sensors, such as a light-detection and ranging sensor ("LIDAR"). LIDAR output data is referred to as point cloud data or point clouds. Point clouds may include large collections of three-dimensional point data (e.g., along the x, y, and z axes). In accordance with one embodiment, the system uses the location information to retrieve one or more previously captured point clouds near an estimated location of the vehicle. In accordance with one embodiment, a currently captured point cloud and one or more previously captured point clouds are used by the system to enhance the estimated location and heading of the vehicle. For example, in accordance with a preferred embodiment of the present invention, the system analyzes one or more previously captured point clouds and selects a previously captured point cloud that is in nearest proximity to the estimated current location and heading of the vehicle. In accordance with an embodiment, the system simplifies the two point clouds, translates and rotates the selected point cloud to match or correlate it to the currently captured point cloud. Matching the previously captured point cloud to the currently captured point cloud allows the system to improve the precision and accuracy of the estimated location and heading of the vehicle. In this way, the vehicle can more safely navigate around the geographic area in which it is located.

DETAILED DESCRIPTION

In the following description of examples, references are made to the accompanying drawings that form a part hereof, and in which it is shown by way of illustration specific examples that can be practiced. It is to be understood that other examples can be used and structural changes can be made without departing from the scope of the disclosed examples. Further, in the context of this disclosure, "autonomous driving" (or the like) can refer to autonomous driving, partially autonomous driving, and/or driver assistance systems.

Figure 1:
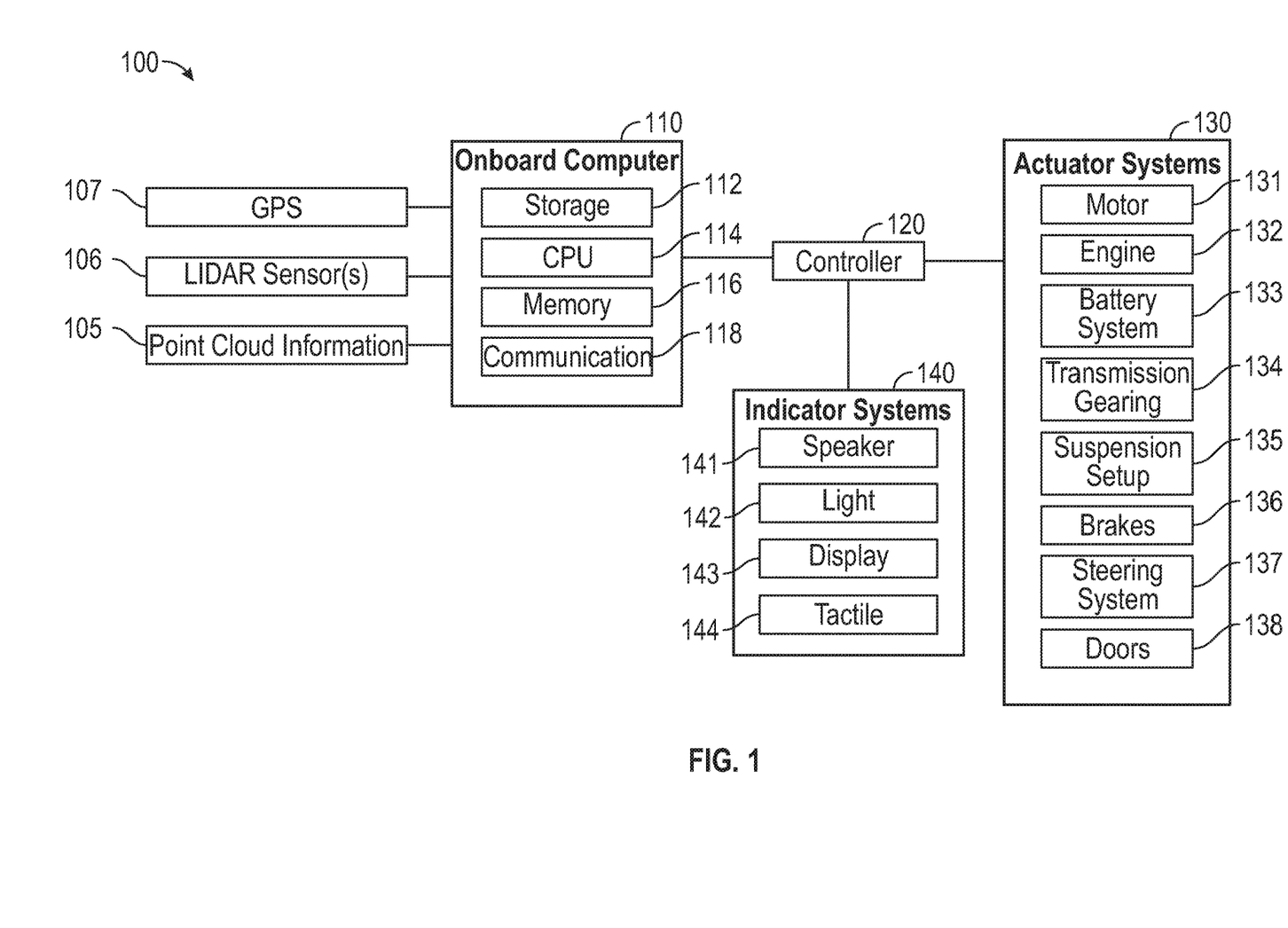
FIG. 1 illustrates a system block diagram of a vehicle control system according to examples of the disclosure.

FIG. 1 illustrates a system block diagram of vehicle control system 100 according to examples of the disclosure. Vehicle control system 100 can perform each of the methods described with reference to FIGS. 2-6. Vehicle control system 100 can be incorporated into a vehicle, such as a consumer automobile. Other examples of vehicles that may incorporate the vehicle control system 100 include, without limitation, airplanes, boats, or industrial automobiles. In accordance with an embodiment, vehicle control system 100 includes a Global Positioning System (GPS) receiver 107 for estimating the vehicle's location and heading and one or more LIDAR sensors 106 for capturing data about the vehicle's surroundings (including point cloud data), as described below with reference to FIGS. 2-6. In some examples, vehicle control system 100 can also include one or more cameras and/or one or more other sensors (e.g., radar, ultrasonic, laser, accelerometer, gyroscope, pressure, temperature, speed, air flow, or smoke) for detecting various characteristics about the vehicle and its surroundings. In some examples, sensor data from multiple sensors can be fused (e.g., combined) at one or more electronic control units (ECUs) (not shown). The particular ECU(s) that are chosen to perform data fusion can be based on an amount of resources (e.g., processing power and/or memory) available to the one or more ECUs, and can be dynamically shifted between ECUs and/or components within an ECU (since an ECU can contain more than one processor) to optimize performance. In accordance with another embodiment, vehicle control system 100 receives point cloud information via a point cloud information interface 105 (e.g., a cellular Internet interface or a Wi-Fi Internet interface).

A vehicle control system 100 according to an embodiment of the present invention can include an on-board computer 110 that is coupled to GPS receiver 107, LIDAR sensor(s) 106, and point cloud information interface 105, and that is capable of receiving data from the output from the GPS receiver 107, LIDAR sensor(s) 106, and the point cloud information interface 105. On-board computer 110 can include storage 112, memory 116, communications interface 118, and a processor 114. Processor 114 can perform any of the methods described with references to FIGS. 2-6. Additionally, communications interface 118 can perform any of the communications described with reference to FIGS. 2-6. Moreover, storage 112 and/or memory 116 can store data and instructions for performing any or all of the methods described with references to FIGS. 2-6. Storage 112 and/or memory 116 can be any non-transitory computer-readable storage medium, such as a solid-state drive or a hard disk drive, among other possibilities. In accordance with one embodiment, the vehicle control system 100 includes a controller 120 capable of controlling one or more aspects of vehicle operation, such as performing autonomous or semi-autonomous driving maneuvers.

In some examples, vehicle control system 100 is electrically connected (e.g., via controller 120) to one or more actuator systems 130 in the vehicle and one or more indicator systems 140 in the vehicle. The one or more actuator systems 130 can include, but are not limited to, a motor 131 or engine 132, battery system 133, transmission gearing 134, suspension setup 135, brakes 136, steering system 137, and door system 138. Vehicle control system 100 controls, via controller 120, one or more of these actuator systems 130 during vehicle operation; for example, to open or close one or more of the doors of the vehicle using the door actuator system 138, to control the vehicle during autonomous driving operations, using the motor 131 or engine 132, battery system 133, transmission gearing 134, suspension setup 135, brakes 136, and/or steering system 137, etc. According to one embodiment, actuator systems 130 includes sensors that send dead reckoning information (e.g., steering information, speed information, etc.) to on-board computer 110 (e.g., via controller 120) to estimate the vehicle's location and heading. The one or more indicator systems 140 can include, but are not limited to, one or more speakers 141 in the vehicle (e.g., as part of an entertainment system in the vehicle), one or more lights 142 in the vehicle, one or more displays 143 in the vehicle (e.g., as part of a control or entertainment system in the vehicle), and one or more tactile actuators 144 in the vehicle (e.g., as part of a steering wheel or seat in the vehicle). Vehicle control system 100 can control, via controller 120, one or more of these indicator systems 140 to provide indications to a driver.

Figure 2:
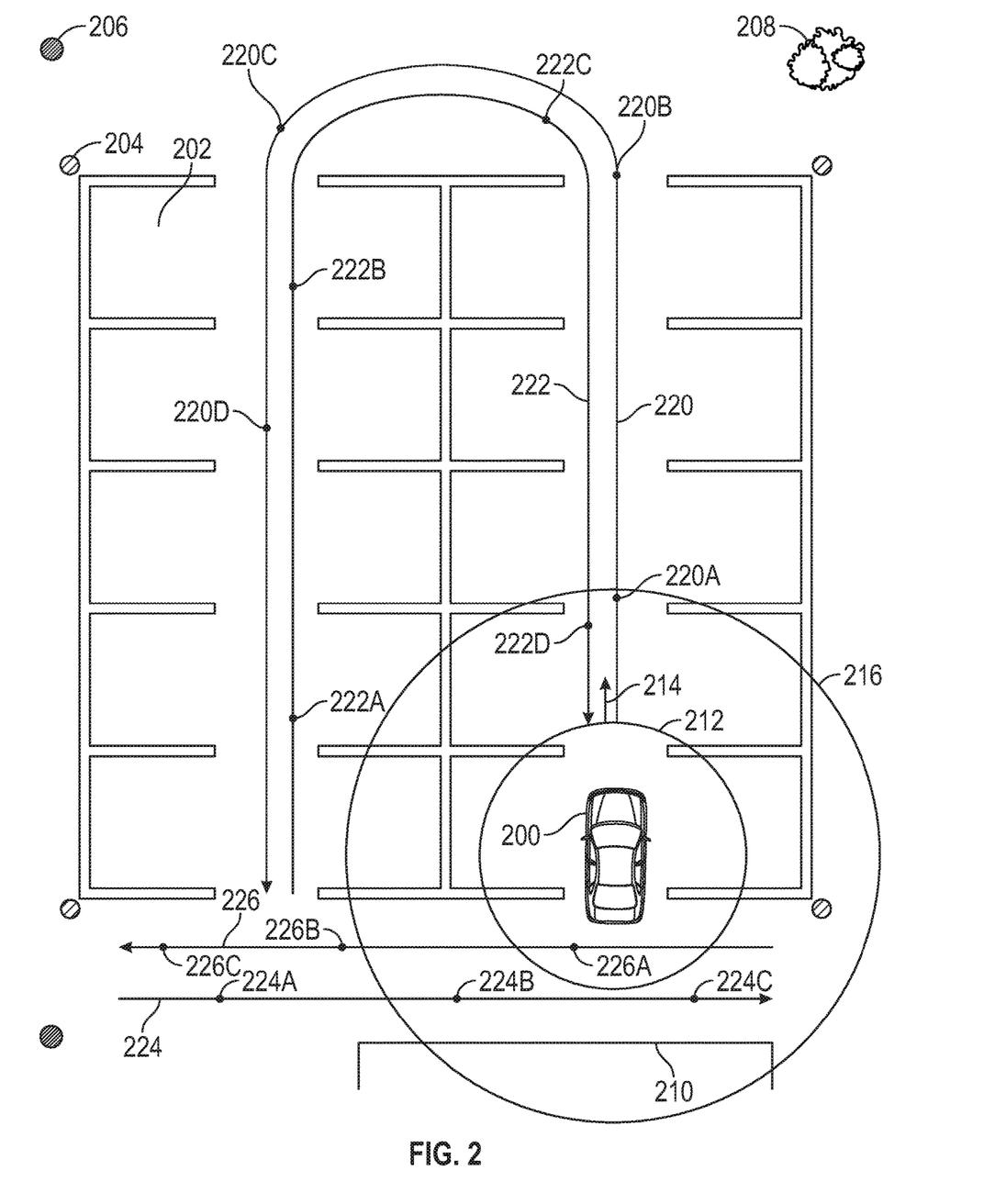
FIG. 2 illustrates a vehicle navigating within a parking lot according to examples of the disclosure.

FIG. 2 illustrates vehicle 200 navigating within parking lot 250 (not drawn to scale) according to examples of the disclosure. In this example, parking lot includes a plurality of parking spots 202, pillars 204, light-posts 206, bushes 208 and building 210. FIG. 2 also illustrates several exemplary driving paths (e.g., 220-226) in which vehicle 200 can navigate. It should be noted that while FIG. 2 illustrates a parking lot, the invention herein can also be used at an intersection, a road, a garage, a road with curbside parking, a driveway, or any geographic location with designated areas for driving and/or parking. It should also be noted that driving paths 220-226 are only exemplary and that additional driving paths within parking lot 250 are possible. For example, additional diving paths can include entering into and/or out of one or more parking spots 202 and/or combining one or more driving paths 220-226 (e.g., combining driving path 220 with driving path 224 or driving path 220 with driving path 222).

Vehicle 200 includes at least one or more of Global Navigation Satellite Systems (GNSS) (e.g., GPS, BeiDou, Galileo, etc.), inertial navigation systems (INS) (e.g., inertial guidance systems, inertial instruments, inertial measurement units (IMU)), and/or sensors (e.g., accelerometers, gyroscopes, magnetometers) for determining the vehicle's location and heading (e.g., as described above with references to FIG. 1). The vehicle's estimated location can be represented by error bounds 212 (e.g., the area in which the vehicle is likely located) and estimated heading 218. The larger the area of error bounds 312 the more uncertainty in the vehicle's location estimate. This can be problematic for autonomous vehicle navigation—particularly for navigating within a parking lot. For example, parking lot 250 can be surrounded by tall buildings (including building 210) which can cause inaccuracies with GPS location determinations due to signal blockage or signal reflections—increasing the area of error bounds 212. An inaccurate location estimate, however, can be corrected using point cloud data as described below.

Vehicle 200 also includes one or more sensors for determining one or more characteristic about the vehicle's surroundings (e.g., as described above with references to FIG. 1). These sensors can include LIDAR sensors, cameras, radar sensors, ultrasonic sensors, laser sensors, or any other sensors that can be used to detect one or more characteristics about the vehicle's surroundings. These sensors can be configured on vehicle 200 to provide it with 360 degree (or other) coverage of the area surrounding the vehicle. In accordance with the preferred embodiment of the disclosure, vehicle 200 can be configured to process data from one or more LIDAR sensors mounted on the vehicle (e.g., on the hood or roof of the vehicle) to capture point cloud data of the area surrounding the vehicle (including point data about signal-poles, telephone poles, power-line poles, traffic signs, street signs, traffic signals, trees, lane dividers, pillars, file hydrants, or any other fixed object or structure in proximity to the vehicle). Area 216 can represent the signal range of the one or more LIDAR sensors (not drawn to scale). Vehicle 200 is further configured to use the currently captured point cloud and at least one previously captured point cloud to improve the vehicle's estimated location (e.g., as described in further detail below). In some examples, the at least one previously captured point cloud can include data beyond the signal range 216.

FIG. 2 also illustrates locations 220A-220D, 222A-222D, 224A-224C, and 226A-226C associated with previously captured point clouds (e.g., points clouds captured from those particular locations). In some examples, these point clouds were previously captured by vehicle 200 while navigating along paths 220-226 and stored in local memory and/or a server. In some examples, the point clouds associated with these locations were previously captured by a vehicle (e.g., vehicle 200 or any other vehicle) driving along paths 220-226 and stored in that vehicle's local memory and/or on a server. In other examples, these point clouds were previously captured by overhead imaging by an aircraft or satellite and stored on a server. To obtain one of these previously captured point clouds, vehicle 200 is configured to identify and load one or more previously captured point clouds based on the vehicle's estimated location 212 and heading 214 (e.g., as described in further detail below). In some examples, vehicle 200's onboard computer can send a request (e.g., through vehicle-to-vehicle, Internet, cellular, radio, or any other wireless communication channels and/or technologies) for one or more point clouds containing the area represented by error bounds 212 to an outside source (e.g., a server, another vehicle). In other examples, vehicle 200 can be configured to store maps in its local memory (e.g., in a database, a hash table, a binary search tree, a data file, an XML file, or a binary decision diagram). In this way, the vehicle's onboard computer can perform a point cloud look up operation for one or more point clouds containing error bounds 212 within its local memory (e.g., as described above with reference to FIG. 1). The computer's onboard computer can then match or correlate the currently captured point cloud to a previously captured point cloud to improve the vehicle's estimated location and to safely navigate around parking lot 250, as described in further detail below.

Figure 3A:
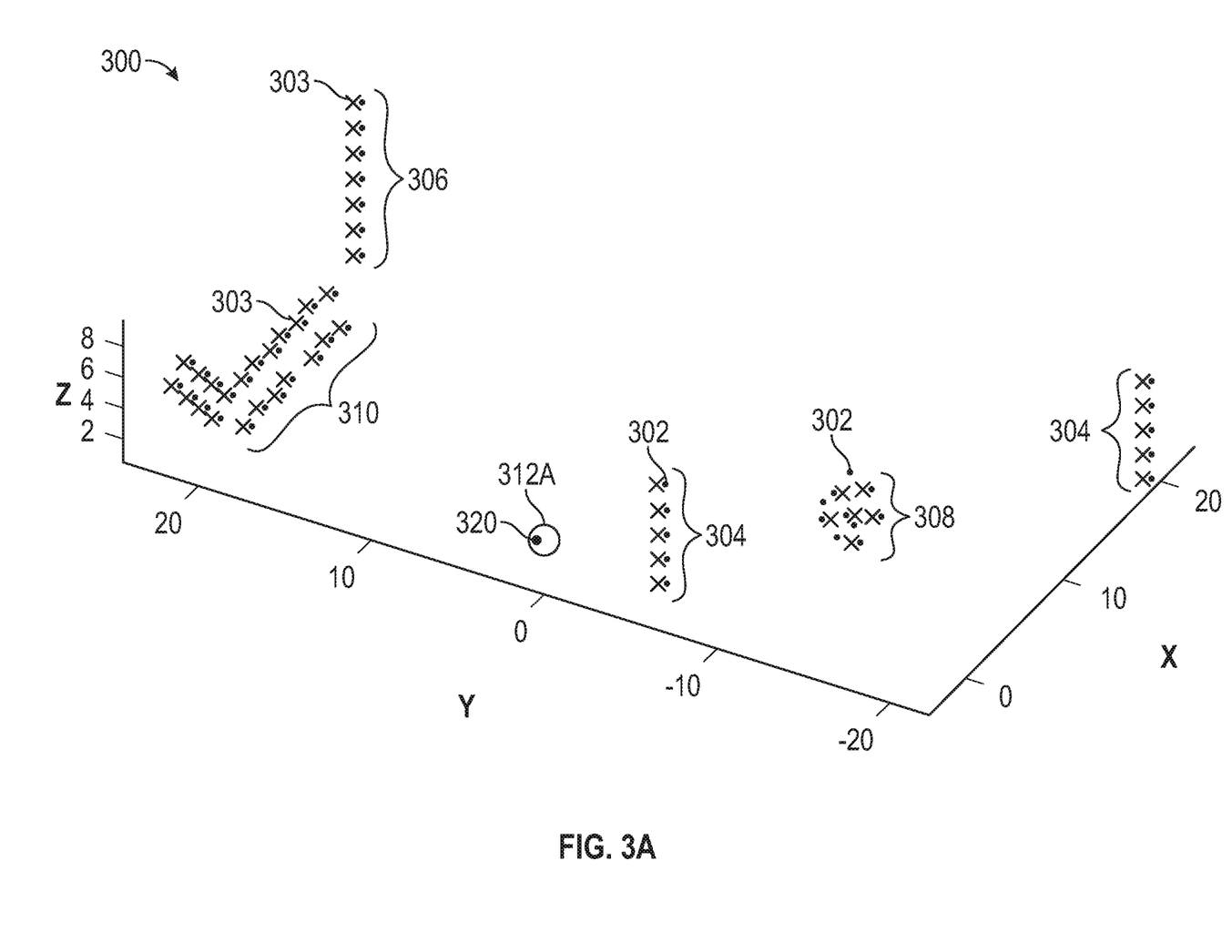
FIG. 3A illustrates point cloud data according to examples of the disclosure.

FIG. 3A illustrates point cloud data 300 according to examples of the disclosure. Specifically, FIG. 3A illustrates data for two point clouds. Data points 302 (illustrated as dots) represent point cloud data currently captured by a vehicle at estimated location 312A. Data points 303 (illustrated as x's) represent point cloud data previously captured from location 320. In some examples, data points 303 were previously captured by the same vehicle currently captured data points 302. In other examples, data points 302 and 303 were captured by two different sources (e.g., two different vehicles). In this example, data points 304 can represent pillars, data points 306 can represent a light-post, data points 308 can represent a bush, and data points 310 can represent a building. Because data points 303 were captured from a known location (e.g., location 320), the two point clouds can be matched or correlated and the correlated data can be used to update estimated location 312A (e.g., as described in further detail below).

Figure 3B:
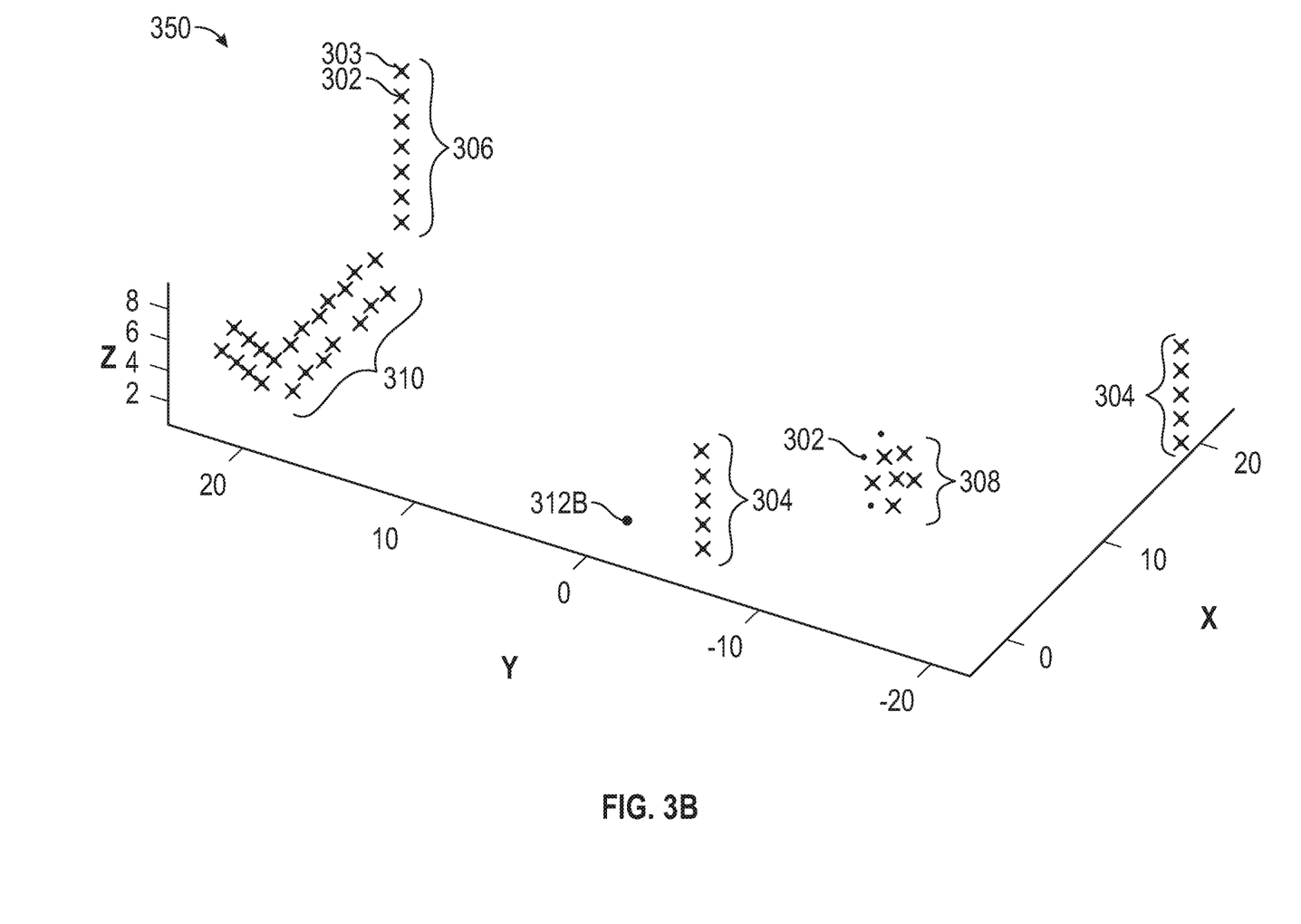
FIG. 3B illustrates correlated point cloud data according to examples of the disclosure.

FIG. 3B illustrates correlated point cloud data 350 according to examples of the disclosure. Specifically, FIG. 3B illustrates data points 303 correlated to data points 302 from FIG. 3A. For example, data points 304 are aligned to show the shape pillars, data points 306 are aligned to show the shape of a light-post, and data points 308 are aligned to show a bush. It should be noted that data points 308 are not all matched or correlated because bushes are dynamic in that they can change over time (e.g., they can grow, they can be cut, leaves can fall). Because data points 303 were captured at a known location (e.g., location 320 from FIG. 3A), this information can be used to improve estimated location 312A of FIG. 3A (illustrated as the smaller dot 312B in FIG. 3B) (e.g., as described in further detail below). In some examples, correlating a previously captured point cloud with a currently captured point cloud can include converting the coordinates of the previously captured point cloud to Vehicle Rear Axle (VRA) coordinates (e.g., coordinates originating from center of vehicle rear axle). It should be noted that FIGS. 3A and 3B show simplified cloud point data. For example, FIGS. 3A and 3B do not include point data of other vehicles and pedestrians (e.g., dynamic objects), the ground, or the vehicle itself. In the preferred embodiment of this invention, the point clouds are simplified prior to performing any matching or correlating operations. Example processes of simplifying point cloud data are described with reference to FIG. 5 below.

Figure 4:
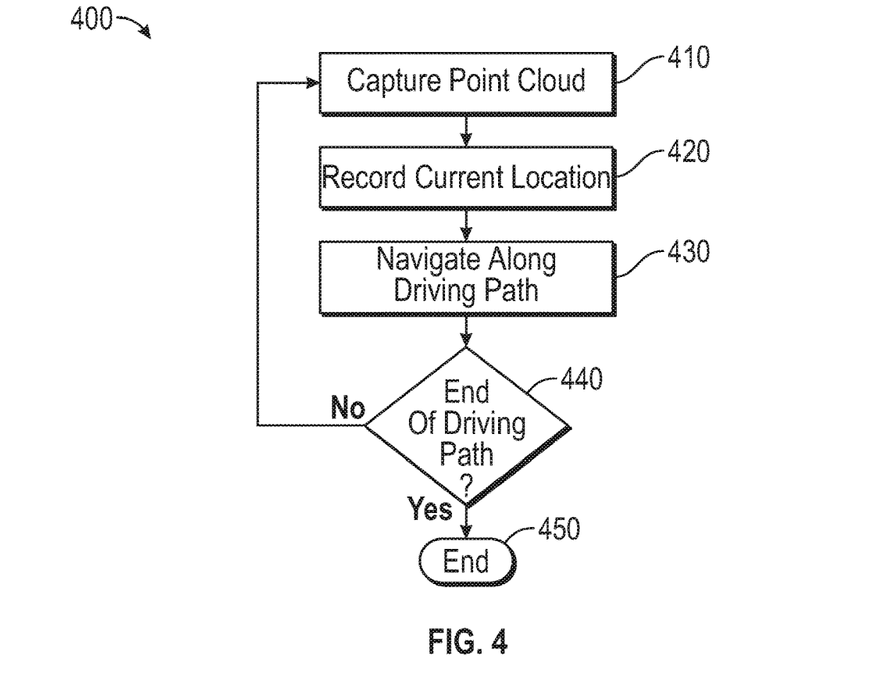
FIG. 4 illustrates a process for capturing point clouds according to examples of the disclosure.

FIG. 4 illustrates process 400 for capturing point clouds according to examples of the disclosure. At step 410, point cloud data is captured using one or more LIDAR sensors (e.g., as described above with reference to FIGS. 1-3). In some examples, the point cloud data is captured with one or more LIDAR sensors mounted on a vehicle (e.g., as described above with reference to FIGS. 1-3). In some examples, the point cloud captured at step 410 will include data from 360 degrees of the vehicle. In other examples, the point cloud will include data from less than 360 degrees of the vehicle (e.g., 60 degree or 180 degree coverage in the direction of the vehicle's heading). At step 410, the location of the one or more LIDAR sensors used to capture the point cloud data is determined. In one embodiment, the location of the one or more LIDAR sensors is determined with dGPS. In other embodiments, the location of the one or more LIDAR sensors is determined with GNSS (e.g., GPS, BeiDou, Galileo, etc.), INS (e.g., inertial guidance systems, inertial instruments, inertial measurement units (IMU)), and/or any other sensors that can be used to determine the location of the one or more sensors. In some embodiments, dead reckoning techniques can be used to determine the location of one or more LIDAR sensors. In response to determining the location of the one or more LIDAR sensors, the point cloud captured at step 410 and the determined location from step 420 are stored locally (e.g., in the local memory of the vehicle) and/or on a remote server. In this way, the point cloud captured at step 410 can be retrieved using the location determined at step 420.

At step 430, the vehicle navigates along a driving path. For example, a driver can manually drive the vehicle from location 220A to location 220B (or any other distance) along driving path 220, as illustrated in FIG. 2. In other examples, process 400 can cause the vehicle to autonomously navigate from location 220A to location 220B. In some examples, process 400 will cause the vehicle to autonomously navigate along a driving path for a predetermined distance (e.g., 10 meters). In other examples, process 400 will cause the vehicle to autonomously navigate along a driving path for a random distance. In some examples, process 400 will cause the vehicle to autonomously navigate along the driving path until the one or more LIDAR sensors of the vehicle detect a previously undetected object. In some examples, the distance for which process 400 causes the vehicle to autonomously navigate at step 430 is manually entered (e.g., by a user or passenger of the vehicle) through a control system such as buttons, a touch screen, a voice command, a computer, a smart phone, or any device or system that allows input to be entered.

At step 440, process 400 determines if the vehicle has navigated to the end of the driving path. In accordance with a determination that the vehicle has not navigated to the end of the driving path, steps 410 through 440 are repeated. In accordance with a determination that the vehicle has navigated to the end of the driving path, process 400 terminates at step 450. In the preferred embodiment of this invention, process 400 is repeated for every possible driving path, including both directions of each possible driving path, of the geographic area being mapped by process 400 (e.g., for each of driving paths 220-226 of FIG. 2). In this way, point clouds are captured from most, if not all, of the areas in which a vehicle can navigate into. It should be noted that, in some examples, step 430 can be performed before step 410. It should also be noted that steps 410 and 420 can be performed concurrently.

Figure 5:
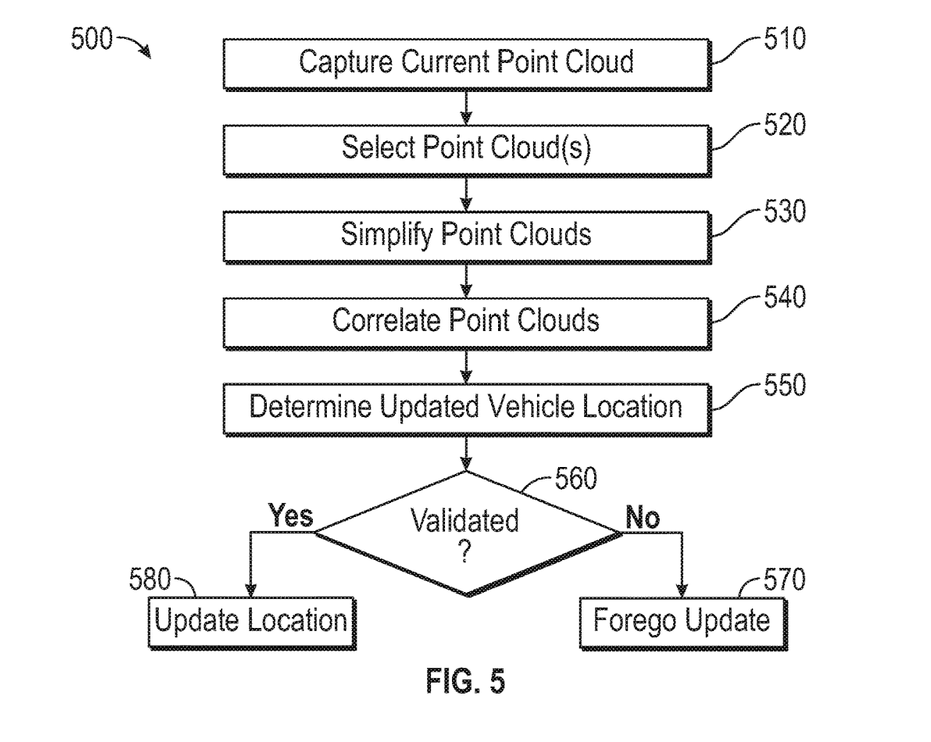
FIG. 5 illustrates a process for localizing a vehicle using point cloud data according to examples of the disclosure.

FIG. 5 illustrates process 500 for localizing a vehicle using point cloud data according to examples of the disclosure. At step 510, process 500 captures the current point cloud with one or more LIDAR sensors mounted on a vehicle (e.g., as described above with reference to FIGS. 1-4). As illustrated in FIG. 2, the area 216 within range of the one or more LIDAR sensors can be limited. Thus, the point cloud captured at step 510 may be limited by the range of the one or more LIDAR sensors mounted on the vehicle (e.g., as illustrated by are 216 of FIG. 2).

At step 520, process 500 estimates the location and heading of the vehicle and selects the point cloud(s) that was previously captured in nearest proximity to the vehicle's estimated location. In one embodiment, process 500 estimates the vehicle's location with GPS and/or dead reckoning techniques. In the preferred embodiment, process 500 selects the point cloud that was previously captured from a location with the lowest distance score from the vehicle's estimated location. In some examples, the distance score can simply be the Euclidean distance from the vehicle's estimated current location to the location from which the previously captured point cloud was originally captured (e.g., as described above with reference to FIGS. 3-4). In some examples, the distance score can be calculated based on the Euclidian distance between the vehicle's estimated current location to the location from which the previously captured point cloud was captured and based on the heading difference between the vehicle's estimated heading and the heading from which the previously captured point cloud was captured (e.g., for instances in which the LIDAR sensor(s) used to capture the previous point cloud had less than 360 degree coverage). For example, the following formula (hereinafter referred to as "Equation 1") can be used to determine the distance score ($q_i$) for each point cloud previously captured near the vehicle's estimated current location, wherein i can be from 1 through M (the total number of stored point clouds within a geographic area such as a parking lot), $d_i$ represents the Euclidian distance from the vehicle's estimated current location to the locations from which each of the previously captured point clouds were captured, $h_i$ represents the absolute difference between vehicle's estimated current heading and the heading from which each of the previously captured point clouds were captured, and a represents a weighted parameter:

$$q_i = (a*d_i) + (1-\alpha)*h_i$$

In the preferred embodiment of the present invention, the weighted parameter α of Equation 1 is set to less than 0.5 (e.g., 0.2) such that more weight is given to heading difference $h_i$ than to Euclidian distance $d_i$. This helps ensure that a point cloud is selected that was captured from a similar angle (e.g., heading) as the vehicle's current heading.

In one embodiment, more than one previously captured point cloud can be selected at step 520. For example, process 500 can select all of the previously captured point clouds with a distance score lower than a predefined threshold number at step 520 (e.g., as described below with reference to FIG. 6). In some examples, process 500 can limit the number of previously captured point clouds selected at step 520 to a maximum (e.g. to ten point clouds). For example, process 500 can rank the distance scores of the previously captured point clouds captured near the estimated current location of the vehicle and select, at step 520, the ten point clouds with the lowest distance score. In other examples, process 500 can use a double rotation Archimedes spiral to limit the number of point clouds selected at step 520. For example, the Archimedes spiral can start at the vehicle's estimated location and end at a predefined search radius. Process 500 can then select previously captured point clouds at equidistant arc length position along the spiral. Because process 500 can limit the number of previously captured point clouds selected at step 520 (e.g. to a maximum of ten point clouds), process 500 can select the first ten point clouds along the Archimedes spiral at step 520. In some examples, the previously captured point clouds can be retried from the local memory of the vehicle's on board computer or from another external source (e.g., another vehicle or a server).

At step 530, the current point cloud captured at step 510 and the previous point cloud(s) selected at step 520 are simplified. In the preferred embodiment of the present invention, process 500 will employ all of the methods of simplifying the point clouds described next.

For example, process 500 can remove point data of the ground and of the vehicle itself at step 530. In some examples, process 500 can remove any points that are less than a threshold distance (e.g., two meters) from the ground. This can help remove data points from dynamic objects (e.g., pedestrians, other vehicles). In some examples, process 500 can also down sample the point clouds (e.g., remove duplicative data points, remove stray data points). This reduces the number of data points and can remove unwanted noise from the point clouds, allowing process 500 to run faster. In some examples, process 500 can remove outliers from the point clouds. For example, process 500 can calculate the distance between a data point in the current point cloud captured at step 510 and what would appear to be the corresponding data point in the point cloud(s) selected at step 520. Process 500 can then remove the data points in both maps for which the calculated distance is greater than a threshold value (e.g., three meters).

At step 540, process 500 will match or correlate the current point cloud captured at step 510 to the previously captured point cloud(s) selected at step 520. In the preferred embodiment of the present invention, process 500 will employ an Interactive Closest Point (ICP) technique to translate and rotate the previously captured point cloud(s) selected at step 520 to the current point cloud captured at step 510 (e.g., as described above with reference to FIGS. 3A-3B). Examples of ICP techniques are described in Aleksandr V. Segal, Dirk Haehnel & Sebastian Thrun, *Generalized-ICP* in Robotics: Science and Systems V 161 (Jeff Trinkle et al., eds., 5th ed. 2009), which is hereby incorporated by reference in its entirety for all purposes. In some examples, process 500 performs multiple ICP iterations starting at different points within the point clouds and determined the matching error for each iteration. This allows process 500 to pick an optimal initialization point with the lowest matching error. To further improve the matching of the previously captured point cloud(s) selected at step 520 to the current point cloud captured at step 510, the ICP technique employed at step 540 can focus only on the points from each point cloud within a threshold distance from the vehicle. The ICP technique can reduce this threshold distance after each iteration of the ICP technique until the threshold distance becomes negligible (e.g., less than 35 cm).

At step 550, process 500 can determine the updated location and heading of the vehicle based vehicle's estimated location (including heading) and the output from step 540. In the preferred embodiment, the updated location and heading of the vehicle will be determined in VRA coordinates. For example, the updated location can include the vehicle's location in the X axis ("X"), the vehicle' location in the Y axis (X), and the vehicle's heading ("H") with the following equations, where "dx" represents the translation of the X coordinate from the ICP output from step 540, "dy" represents the translation of the Y coordinate from the ICP output from step 540, "yaw" represents the heading of the vehicle about the Z axis from the ICP output, "Estimated X" represents the vehicle's estimated location along the X axis, "Estimated Y" represents the vehicle's estimated location along the Y axis, and "Estimated H" represents the vehicle's estimated heading:

$$X = (\text{Estimated } X) + dx * \cos d(\text{Estimated } H) + dy * \sin d(\text{Estimated } H)$$

$$Y = (\text{Estimated } Y) + dx * \sin d(\text{Estimated } H) - dy * \cos d(\text{Estimated } H)$$

$$H = (\text{Estimated } H) + yaw$$

In one embodiment, steps 530 through 550 can be repeated with an even more simplified version of a previously captured map or "clean map". For example, a clean map can include only data points for pole-shaped structures (e.g., a point cloud with data points not related to pole-shaped structures removed)—making process 500 simpler and faster. In some examples, steps 530 through 550 can be repeated with the correlated point cloud from step 540 and the clean map. In other examples, steps 530 through 550 can be repeated with the currently captured point cloud from step 510 and the clean map. In either case, process 500, at step 560, uses the result of the clean map matching over the result from matching or correlating of the current point cloud captured at step 510 to the previously captured point cloud(s) selected at step 520 (e.g., the "original matching") only if the result of the clean map matching is close to the original matching. Otherwise, the original matching is used.

At step 560, process 500 validates the correlated point cloud from step 540. If the correlated point cloud is validated, process 500 updates the vehicle's current location and heading in the vehicle's coordinate system for autonomous navigation. In the preferred embodiment of the present invention, process 500 can employ both the root mean square error (RMSE) and history based validation techniques described next. Moreover, in the preferred embodiment of the present invention, the updated location and heading of the vehicle will be validated at step 560 only if both techniques validate the update. Other embodiments will either employ only the RMSE technique or only the history based technique described below.

In some examples, process 500 can validate the correlated point cloud data from step 540 using the RMSE of the output of the ICP matching (e.g., the difference between corresponding data points in the correlated data clouds from step 540). For example, process 500 can validate the correlated point cloud if the RMSE of the matching is below a threshold value. In this way, process 500 can avoid updating the location and heading of the vehicle based on a poorly matched iteration (e.g., because the corresponding matched points in the point clouds are too far apart, which causes higher RMSE values).

In some examples, process 500 can validate the matched point cloud data from step 540 using history based validation. For example, process 500 can store a history of location and heading updates from step 550 and compare the current updated vehicle location and heading from step 550 with this stored history. If the difference between the current updated vehicle location and the last stored location update is within a threshold distance (e.g., half a meter) along both the X and Y axes and the difference between the current updated vehicle heading and the last stored heading update is within a threshold angle (e.g., one degree), process 500 will validate the updated vehicle location and heading from step 550. In this way, process 500 can avoid erroneous jumps in location and heading updates. It should be noted that while an accurate jump in a location or heading update may erroneously not be validated in some instances, that invalidated location and heading update will be stored and compared to the next location and heading update. If the jump in the location or heading was erroneously invalidated, the next update will be validated because the next location and heading update will be within the threshold distance and/or threshold angle of the erroneously invalidated location and heading update. Therefore, according to embodiments of the present invention, an accurate jump in location or heading update will be validated in subsequent iterations using a history based validation approach.

In the embodiment where more than one previously captured point cloud are selected at step 520, process 500 can select the previously captured point cloud and the corresponding location and heading update from step 550 at step 560. For example, process 500 can, at step 560, select the previously captured point cloud and the corresponding location and heading update from step 550 with the lowest RMSE value. Process 500 can then validate the selected location and heading update as described above.

Figure 6:
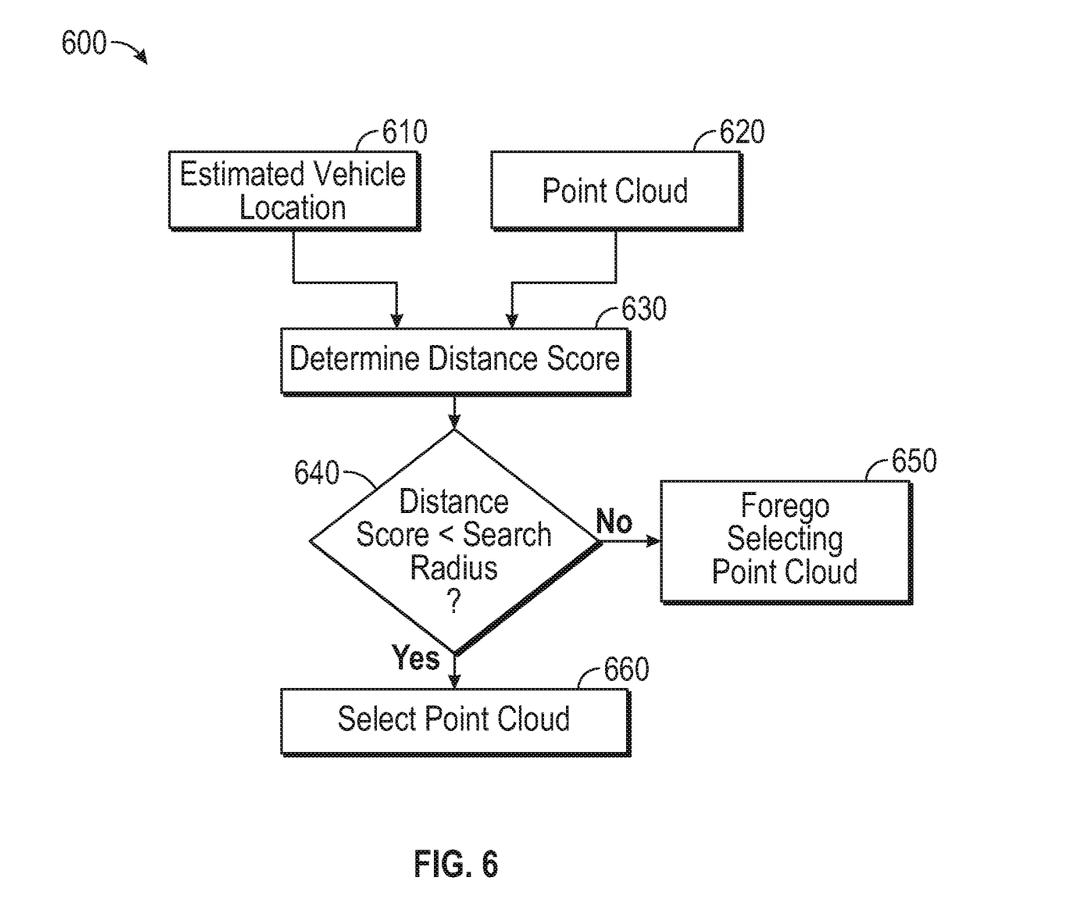
FIG. 6 illustrates a process for selecting point clouds captured in proximity to a vehicle's estimated location according to examples of the disclosure.

FIG. 6 illustrates process 600 for selecting point clouds captured in proximity to a vehicle's estimated location according to examples of the disclosure. In some examples, process 600 can be used as a subroutine of process 500 at step 520. For example, process 500 can invoke process 600 at step 520 for each previously captured point cloud that includes data for the area containing a vehicle's estimated location. In some examples, process 600 is run on the vehicle's onboard computer (e.g., as described above with reference to FIG. 1). In other examples, process 600 is run on another vehicle's onboard computer (e.g., as described above with reference to FIG. 1). In some examples, process 600 is run on a remote server, separate from the vehicle.

At step 610, an estimated location and heading of a vehicle is received. As described above, the vehicle's location can be estimated with GPS, dead reckoning, and/or any other techniques that can be used to estimate a vehicle's location. The vehicle's estimated location can be represented by an error bounds—the area in which the vehicle is likely located (e.g., as described above with reference to FIG. 2).

At step 620, point cloud data is received. For example, a point cloud that includes data about the area containing vehicle's estimated location is received at step 620. In some examples, the point cloud data can be received from local memory and/or from another external source (e.g., a vehicle or a server) (e.g., as described above with reference to FIGS. 1-5).

At step 630, a distance score for the point cloud received at step 620 is determined. For example, a distance score (q) for the point cloud received at step 620 can be calculated with the following formula (hereinafter referred to as "Equation 2"), where d represents the Euclidian distance from the vehicle's estimated location received at step 610 to the location from which the point cloud received at step 620 was captured, h represents the absolute difference between vehicle's estimated heading received at step 610 and the heading from which the point cloud received at step 620 was captured, and a represents a weighted parameter (e.g., as described above with reference to FIG. 5):

$$q=(\alpha*d)+(1-\alpha)*h$$

In the preferred embodiment of the present invention, the weighted parameter α of Equation 2 is set to less than 0.5 (e.g., 0.2) such that more weight is given to heading difference h than to Euclidian distance h. This helps ensure that only point clouds that were captured from a similar angle (e.g., heading) as the vehicle's estimated heading are selected. In one embodiment, the distance score can be the Euclidian distance from the vehicle's estimated location received at step 610 to the location from which the point cloud received at step 620 was captured.

At step 640, process 600 determines whether the calculated distance score (e.g., q in Equation 2 above) is less than a search radius. If the distance score calculated at step 630 is less than the search radius, the point cloud received at step 620 is selected by process 600 at step 660. If the distance score calculated at step 630 is not less than (e.g., equal to or greater than) search radius, the point cloud received at step 620 is not selected by process 600 at step 660. In some examples, the search radius is predefined (e.g., 100 yards). In some examples, the search radius is an input parameter for process 600. For example, process 500 can provide the search radius to process 600 as an input parameter when invoking process 600 at step 520. In some examples, process 500 can rerun process 600 with different search radii for each previously captured point cloud that includes data for the area containing a vehicle's estimated location at step 520. For example, if process 600 selects too many point clouds, process 500 can rerun process 600 with a smaller search radius for each previously captured point cloud that includes data for the area containing a vehicle's estimated location at step 520 such that fewer point clouds are selected by process 600. It should be noted that process 500 can continue to rerun process 600 with different search radii until a desired number of point clouds are selected (e.g., less than 10 point clouds). In another example, if process 600 does not select any point clouds, process 500 can rerun process 600 with a larger search radius for each previously captured point cloud that includes data for the area containing a vehicle's estimated location at step 520. In other sources, the search radius is manually entered (e.g., by a user or passenger of the vehicle) through a control system such as buttons, a touch screen, a voice command, a computer, a smart phone, or any device or system that allows input to be entered.

Thus, the examples of the disclosure provide various ways to enhance localization techniques for safe autonomous vehicle navigation.

Therefore, according to the above, some examples of the disclosure are directed to a system for use in a vehicle, the system comprising: one or more sensors; one or more processors operatively coupled to the one or more sensors; and a memory including instructions, which when executed by the one or more processors, cause the one or more processors to perform a method comprising the steps of: capturing a current point cloud with the one or more sensors; determining an estimated location and an estimated heading of the vehicle; selecting one or more point clouds based on the estimated location and heading of the vehicle; simplifying the current point cloud and the one or more point clouds; correlating the current point cloud to the one or more point clouds; and determining an updated estimate of the location of the vehicle based on correlation between the current point cloud and the one or more point clouds. Additionally or alternatively to one or more of the examples disclosed above, in some examples, the one or more sensors comprises a LIDAR sensor. Additionally or alternatively to one or more of the examples disclosed above, in some examples, the estimated location of the vehicle comprises an error bounds defining an area in which the vehicle is likely located. Additionally or alternatively to one or more of the examples disclosed above, in some examples, selecting the one or more point clouds based on the estimated location and heading of the vehicle comprises retrieving the one or more point clouds containing data about the area defined by the error bounds. Additionally or alternatively to one or more of the examples disclosed above, in some examples, selecting the one or more point clouds based on the estimated location and heading of the vehicle further comprises: for each of the one or more point clouds containing data about the area defined by the error bounds: determining a distance score for a respective point cloud; determining whether the distance score is less than a search radius; in accordance with a determination that the distance score is less than the search radius, selecting the respective point cloud; and in accordance with a determination that the distance score is not less than the search radius, forgoing selecting the respective point cloud. Additionally or alternatively to one or more of the examples disclosed above, in some examples, the distance score is based on the estimated location and heading of the vehicle. Additionally or alternatively to one or more of the examples disclosed above, in some examples, selecting the one or more point clouds based on the estimated location and heading of the vehicle further comprises: for each of the one or more point clouds containing data about the area defined by the error bounds, determining a distance score for a respective point cloud; selecting the respective point cloud with the lowest distance score. Additionally or alternatively to one or more of the examples disclosed above, in some examples, selecting the one or more point clouds based on the estimated location and heading of the vehicle further comprises: for each of the one or more point clouds containing data about the area defined by the error bounds, determining a distance score for a respective point cloud; selecting up to ten of the one or more point clouds with the lowest distance score. Additionally or alternatively to one or more of the examples disclosed above, in some examples, the one or more point clouds containing data about the area defined by the error bounds are retrieved from the memory. Additionally or alternatively to one or more of the examples disclosed above, in some examples, the one or more point clouds were previously captured by the vehicle. Additionally or alternatively to one or more of the examples disclosed above, in some examples, the one or more point clouds containing data about the area defined by the error bounds are retrieved from a remote server. Additionally or alternatively to one or more of the examples disclosed above, in some examples, the one or more point clouds were previously captured by the vehicle or another vehicle. Additionally or alternatively to one or more of the examples disclosed above, in some examples, simplifying the current point cloud and the one or more point clouds comprises one or more of: removing data points due to ground and the vehicle from the current point cloud and the one or more point clouds; down-sampling the current point cloud and the one or more point clouds; and removing outlier data points from the current point cloud and the one or more point clouds. Additionally or alternatively to one or more of the examples disclosed above, in some examples, removing outlier data points from the current point cloud and the one or more point clouds comprises: calculating a distance from a first data point in the current point cloud to a corresponding data point in the one or more point clouds; and in accordance with a determination that the distance is greater than a threshold, removing the first data point and the corresponding data point from the current point cloud and the one or more point clouds. Additionally or alternatively to one or more of the examples disclosed above, in some examples, the threshold is three meters. Additionally or alternatively to one or more of the examples disclosed above, in some examples, correlating the current point cloud to the one or more point clouds comprises translating and rotating the one or more point clouds and the current point cloud with an Interactive Closest Point (ICP) technique. Additionally or alternatively to one or more of the examples disclosed above, in some examples, the ICP technique is performed multiple times with different starting points. Additionally or alternatively to one or more of the examples disclosed above, in some examples, correlating the current point cloud to the one or more point clouds further comprises: calculating a distance from a first data point in the current point cloud to a corresponding data point in the one or more point clouds; and in accordance with a determination that the distance is equal to or greater than a threshold, forgoing correlating the first data point in the current point cloud to the corresponding data point in the one or more point clouds.

Some examples of the disclosure are directed to a non-transitory computer-readable medium including instructions, which when executed by one or more processors, cause the one or more processors to perform a method comprising: capturing a current point cloud with one or more sensors; determining an estimated location and an estimated heading of a vehicle; selecting one or more point clouds based on the estimated location and heading of the vehicle; simplifying the current point cloud and the one or more point clouds; correlating the current point cloud to the one or more point clouds; and determining an updated estimate of the location of the vehicle based on correlation between the current point cloud and the one or more point clouds.

Some examples of the disclosure are directed to a method comprising: capturing a current point cloud with one or more sensors; determining an estimated location and an estimated heading of a vehicle; selecting one or more point clouds based on the estimated location and heading of the vehicle; simplifying the current point cloud and the one or more point clouds; correlating the current point cloud to the one or more point clouds; and determining an updated estimate of the location of the vehicle based on correlation between the current point cloud and the one or more point clouds.

Although examples have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A system for use in a vehicle, the system comprising:
one or more sensors;
one or more processors operatively coupled to the one or more sensors; and
a memory including instructions, which when executed by the one or more processors, cause the one or more processors to perform a method comprising the steps of:
  capturing a current point cloud with the one or more sensors;
  determining an estimated location and an estimated heading of the vehicle;
  selecting one or more point clouds based on the estimated location and heading of the vehicle;
  simplifying the current point cloud and the one or more point clouds;
  correlating the current point cloud to the one or more point clouds; and
  determining an updated estimate of the location of the vehicle based on correlation between the current point cloud and the one or more point clouds.

2. The system of claim 1, wherein the one or more sensors comprises a LIDAR sensor.

3. The system of claim 1, wherein the estimated location of the vehicle comprises an error bounds defining an area in which the vehicle is likely located.

4. The system of claim 3, wherein selecting the one or more point clouds based on the estimated location and heading of the vehicle comprises retrieving the one or more point clouds containing data about the area defined by the error bounds.

5. The system of claim 4, wherein selecting the one or more point clouds based on the estimated location and heading of the vehicle further comprises:
  for each of the one or more point clouds containing data about the area defined by the error bounds:
    determining a distance score for a respective point cloud;
    determining whether the distance score is less than a search radius;
    in accordance with a determination that the distance score is less than the search radius, selecting the respective point cloud; and
    in accordance with a determination that the distance score is not less than the search radius, forgoing selecting the respective point cloud.

6. The system of claim 5, wherein the distance score is based on the estimated location and heading of the vehicle.

7. The system of claim 4, wherein selecting the one or more point clouds based on the estimated location and heading of the vehicle further comprises: for each of the one or more point clouds containing data about the area defined by the error bounds, determining a distance score for a respective point cloud; selecting the respective point cloud with the lowest distance score.

8. The system of claim 4, wherein selecting the one or more point clouds based on the estimated location and heading of the vehicle further comprises: for each of the one or more point clouds containing data about the area defined by the error bounds, determining a distance score for a respective point cloud; selecting up to ten of the one or more point clouds with the lowest distance score.

9. The system of claim 4, wherein the one or more point clouds containing data about the area defined by the error bounds are retrieved from the memory.

10. The system of claim 9, wherein the one or more point clouds were previously captured by the vehicle.

11. The system of claim 4, wherein the one or more point clouds containing data about the area defined by the error bounds are retrieved from a remote server.

12. The system of claim 11, wherein the one or more point clouds were previously captured by the vehicle or another vehicle.

13. The system of claim 1, wherein simplifying the current point cloud and the one or more point clouds comprises one or more of:
  removing data points due to ground and the vehicle from the current point cloud and the one or more point clouds;
  down-sampling the current point cloud and the one or more point clouds; and
  removing outlier data points from the current point cloud and the one or more point clouds.

14. The system of claim 13, wherein removing outlier data points from the current point cloud and the one or more point clouds comprises:
  calculating a distance from a first data point in the current point cloud to a corresponding data point in the one or more point clouds; and
  in accordance with a determination that the distance is greater than a threshold, removing the first data point and the corresponding data point from the current point cloud and the one or more point clouds.

15. The system of claim 14, wherein the threshold is three meters.

16. The system of claim 1, wherein correlating the current point cloud to the one or more point clouds comprises translating and rotating the one or more point clouds and the current point cloud with an Interactive Closest Point (ICP) technique.

17. The system of claim 16, wherein the ICP technique is performed multiple times with different starting points.

18. The system of claim 1, wherein correlating the current point cloud to the one or more point clouds further comprises:
   calculating a distance from a first data point in the current point cloud to a corresponding data point in the one or more point clouds; and
   in accordance with a determination that the distance is equal to or greater than a threshold, forgoing correlating the first data point in the current point cloud to the corresponding data point in the one or more point clouds.

19. A non-transitory computer-readable medium including instructions, which when executed by one or more processors, cause the one or more processors to perform a method comprising:
   capturing a current point cloud with one or more sensors;
   determining an estimated location and an estimated heading of a vehicle;
   selecting one or more point clouds based on the estimated location and heading of the vehicle;
   simplifying the current point cloud and the one or more point clouds;
   correlating the current point cloud to the one or more point clouds; and
   determining an updated estimate of the location of the vehicle based on correlation between the current point cloud and the one or more point clouds.

20. A method comprising:
   capturing a current point cloud with one or more sensors;
   determining, by a processor, an estimated location and an estimated heading of a vehicle;
   selecting, by a processor, one or more point clouds based on the estimated location and heading of the vehicle;
   simplifying, by a processor, the current point cloud and the one or more point clouds;
   correlating, by a processor, the current point cloud to the one or more point clouds; and
   determining, by a processor, an updated estimate of the location of the vehicle based on correlation between the current point cloud and the one or more point clouds.

* * * * *